(12) United States Patent
Krishnan et al.

(10) Patent No.: US 8,949,842 B2
(45) Date of Patent: Feb. 3, 2015

(54) METHOD AND APPARATUS FOR LOCATING LOAD-BALANCED FACILITIES

(75) Inventors: Shankar Krishnan, Chatham, NJ (US); Aaron Archer, South Orange, NJ (US)

(73) Assignee: AT&T Intellectual I, L.P., Atlanta, GA (US)

( * ) Notice: Subject to any disclaimer, the term of this patent is extended or adjusted under 35 U.S.C. 154(b) by 1678 days.

(21) Appl. No.: 12/347,810

(22) Filed: Dec. 31, 2008

(65) Prior Publication Data

US 2010/0169891 A1 Jul. 1, 2010

(51) Int. Cl.
*G06F 9/50* (2006.01)
*H04L 12/24* (2006.01)

(52) U.S. Cl.
CPC ............ *G06F 9/5072* (2013.01); *G06F 9/5027* (2013.01); *H04L 41/145* (2013.01)
USPC .......................................................... 718/104

(58) Field of Classification Search
None
See application file for complete search history.

(56) References Cited

U.S. PATENT DOCUMENTS 7,346,676 B1 * 3/2008 Swildens et al. .............. 709/223
2007/0245352 A1 * 10/2007 Ma ................................. 718/105

FOREIGN PATENT DOCUMENTS

EP 794491 A2 * 9/1997

* cited by examiner

*Primary Examiner* — Jacob A Petranek

(57) ABSTRACT

A method and apparatus for providing a facility location plan for a network with a V-shaped facility cost are disclosed. For example, the method receives an event from a queue, wherein the event comprises an open event or a tight event. The method connects a plurality of adjacent clients to a facility, if the event comprises the open event, and adds a new client-facility edge to a graph comprising a plurality of client-facility edges, if the event comprises the tight event.

20 Claims, 4 Drawing Sheets

METHOD AND APPARATUS FOR LOCATING LOAD-BALANCED FACILITIES

The present invention relates generally to communication and transportation networks and, more particularly, to a method for locating facilities in a network, e.g., Internet Protocol (IP) network, wireless network, distribution network for physical goods, and the like.

BACKGROUND OF THE INVENTION

Today's communications networks are vast and complex. Service providers invest a great deal of resources to plan their network and capital expenditures. For example, service providers need to determine where to place their network resources, e.g., servers, routers and the like. The service provider may plan facility locations with the goal of providing services to customers with an efficient use of the network resources.

SUMMARY OF THE INVENTION

In one embodiment, the present invention discloses a method and apparatus for providing a facility location plan for a network with V-shaped facility costs. For example, the method receives an event from a queue, wherein the event comprises an open event or a tight event. The method connects a plurality of adjacent clients to a facility, if the event comprises the open event, and adds a new client-facility edge to a graph comprising a plurality of client-facility edges, if the event comprises the tight event.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

A customer may be able to access a set of potential facilities that can provide the service. One method for modeling the service cost of a facility location solution is to assign a fixed cost for using the facility at all (i.e., "opening" it), and serving an unlimited amount of demand. Another method is to assume a facility cost that increases monotonically with the demand served. In both cases, there is also a transportation cost associated with connecting each demand to a facility, in addition to the service cost. However, both the connection cost for a customer to reach a facility and the cost of providing the service over the facility are different for different facilities.

Once the costs have been modeled, one can attempt to compute an optimal placement of facilities and assignment of customers to facilities that minimizes the sum of the service and connection costs. In some cases, the service cost may be chosen to represent an actual monetary cost. In other cases, the service cost may be chosen strictly as a modeling tool in order to cause the facility placement and customer assignment optimization algorithm to achieve other design objectives. For instance, if one goal is to place facilities in such a way that the service costs are low, but the customer assignments also balance load amongst the facilities, then one could choose the service costs to start off high at low loads, decrease to a minimum at some desired "ideal" load, and then increase for higher loads. This has the effect of influencing the optimization algorithm to balance loads amongst the facilities at levels near their ideal loads.

Most facility location models, including the ones addressed by this invention, are NP-hard, which means that there are mathematical theorems proving that it is difficult or impossible (in a mathematically-quantifiable sense) to create computationally-efficient algorithms that are guaranteed to solve the models to optimality. In the face of this difficulty, one can resort to heuristic algorithms that intuitively make sense and often compute near-optimal solutions in practice, but do not have any provable guarantees concerning the quality of the solutions they generate. In some cases, one can obtain an approximation algorithm, which is guaranteed to generate a solution whose objective function value is no greater than a specified factor times that of the optimal solution.

The present invention broadly discloses a method and apparatus for providing a facility location plan for a network with V-shaped facility costs. Although the present invention is discussed below in the context of Internet Protocol (IP) networks, the present invention is not so limited. Namely, the present invention can be applied for other packet networks, switched networks, wireless networks, distribution networks for physical goods, and the like.

Figure 1:
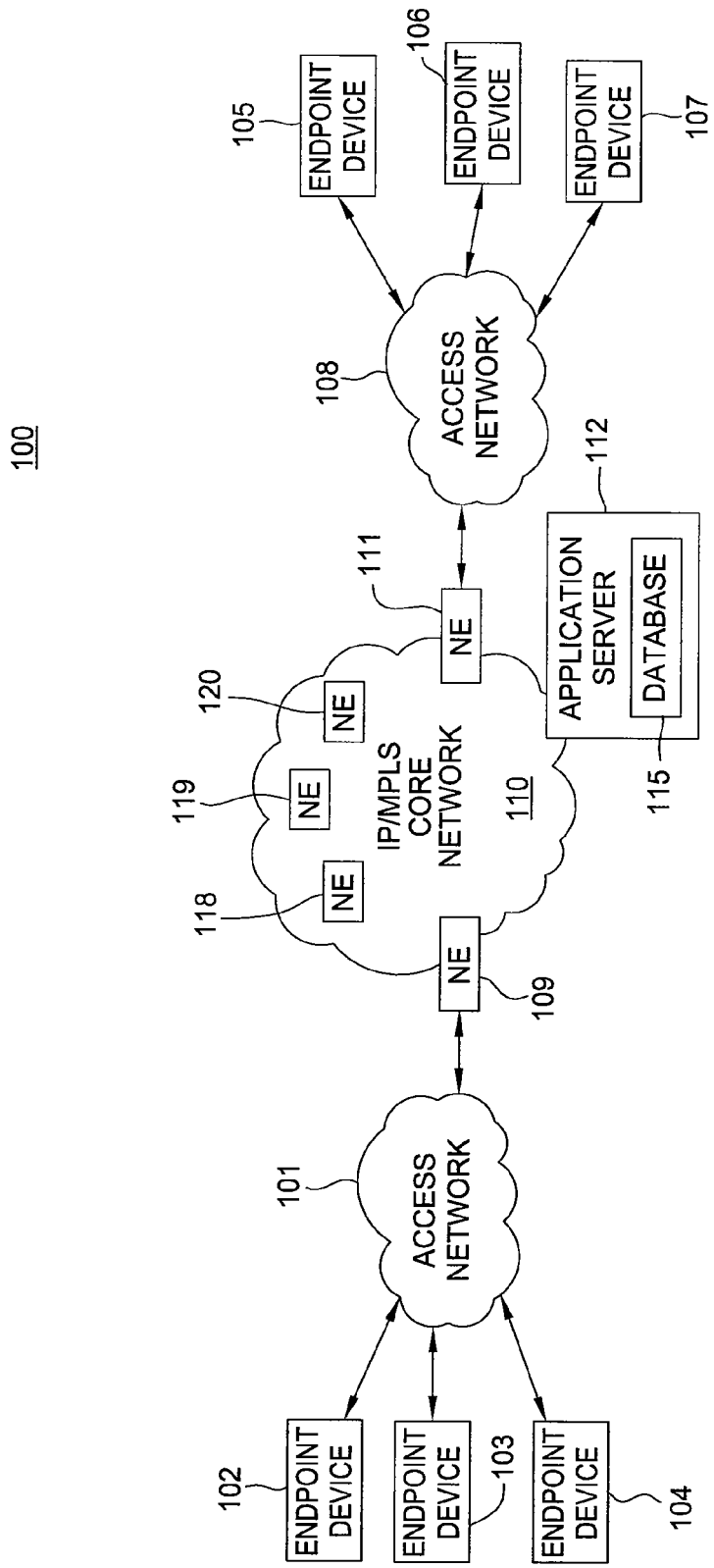
FIG. 1 is a block diagram depicting an exemplary packet network related to the current invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication network 100 may be expanded by including additional endpoint devices, access networks, network elements, application servers without altering the scope of the present invention. The above IP network is described to provide an illustrative environment in which packets for voice and data services are transmitted on networks.

In one embodiment, the current invention discloses a method and apparatus for planning one or more facility locations in networks such as Internet Protocol (IP) networks. More specifically, the method provides a facility location plan in a network by selecting a set of facilities in the network and an assignment of a given set of clients in the network to this set of facilities that minimizes the sum of two types of costs: 1) a connection cost between each client and its assigned facility, and 2) a facility cost for each open facility.

In one embodiment, the connection cost for a demand is proportional to the distance between that demand and the facility that serves it. In a communication network, this connection cost could represent air miles, fiber miles, or routing latency; in a physical distribution network, it could represent the cost of transporting goods. In one embodiment, the facility cost may comprise one or more facility cost functions, e.g., a function of the amount of demand served by that facility and so on.

In general, the form of the facility cost functions is flexible, other than that the facility cost functions are non-negative everywhere and evaluate to zero when the demand served is zero. The problem of finding the facility locations that minimize the sum of the two types of cost may also be referred as the Facility Location with Arbitrary Facility Costs (FLAFC) problem. The current invention addresses a special case of the FLAFC problem, called the V-shaped Facility Location (VFL) problem. In this version, the facility cost for each facility i is V-shaped, meaning that it achieves a minimum at some non-negative cost $F_i$, when the demand served equals some ideal level $U_i$, and increases linearly at rate $\Lambda_i$ every unit by which the demand deviates from the ideal $U_i$. If the facility serves no demand, then one does not open it and hence pays zero facility cost. Thus, the V-shaped functions have a discontinuity at zero. The graph of this type of function looks V-shaped, hence the name. The Uniform V-shaped Facility Location (UVFL) problem refers to the further specialization of the VFL problem where each facility has the same V-shaped cost function, i.e., the triple $(F_i, \Lambda_i, U_i)$ is the same for each facility i.

In one embodiment, for the UVFL problem, the present algorithm is an approximation algorithm, i.e., one can prove mathematically that the cost of the solution produced by the present algorithm is never worse than some constant factor times the cost of the optimal solution, where the constant factor is a particular function of the ratio $$\frac{\Lambda_i U_i}{F_i},$$

but does not depend on the scale of the problem instance.

Figure 2:
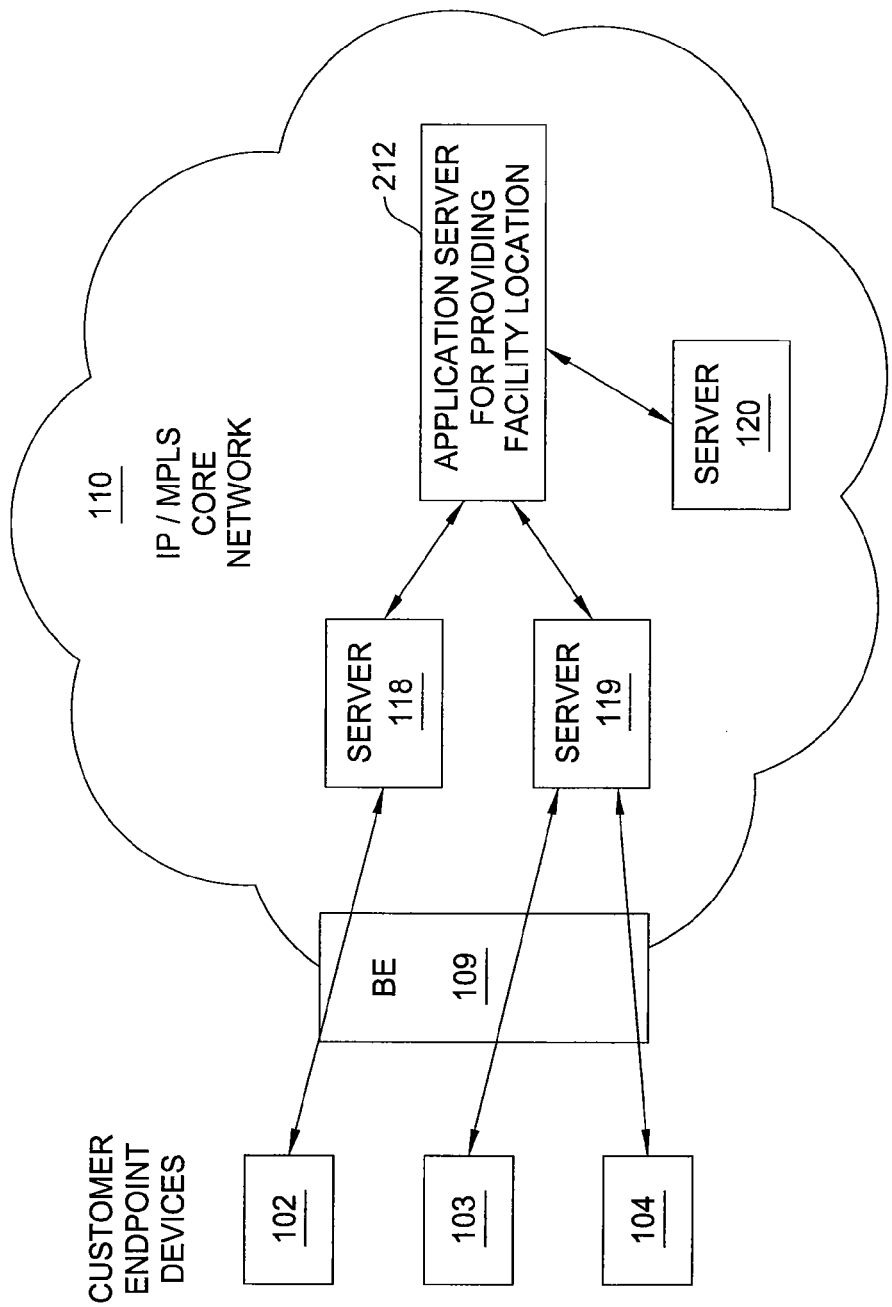
FIG. 2 illustrates an exemplary network in which to locate facilities.

FIG. 2 illustrates an exemplary network 200 in which to locate facilities. For example, customer endpoint devices 102-104 access services from the IP/MPLS network 110 via a border element 109. The IP/MPLS core network 110 may contain servers 118, 119 and 120 for providing services to the customers. A customer may receive service from any one of the servers 118, 119 or 120. The IP/MPLS core network 110 also contains an application server 212 for deciding on facility locations. The application server 212 assigns each of the clients (e.g., customer endpoint devices) 102, 103 and 104 to be serviced by one of the servers (or more broadly facilities having one or more network resources such as a server, a switch, a router and the like) 118, 119 or 120. In one embodiment, the application server 212 selects the particular server (or facility) each customer endpoint device should use by using the current invention to minimize the sum of all connection costs and facility costs as described below.

In order to clearly illustrate the teachings of the current invention, the mathematical model will first be provided below. The description below discloses one general algorithm for addressing the FLAFC problem. The description then shows how one embodiment of the present algorithm can compute the same result in a more efficient manner if all the facility costs happen to be V-shaped (i.e., for the VFL problem).

Let, $\mathcal{F}$ represent a set of facilities, $n_f = |F|$ represent the number of facilities in the set $\mathcal{F}$, C represent a set of clients (or demand points), and $n_c = |C|$ represent the number of clients in the set C.

For each facility $i \in \mathcal{F}$ and each demand point $j \in C$, there is a connection cost $d_{ij}$, which is the cost of serving one unit of demand from client j by the facility i. For simplicity of exposition, the present description describes the algorithm in the case where each client represents one unit of demand. Those skilled in the art will realize that the algorithm can be modified to handle arbitrary demands from each client. For each facility $i \in \mathcal{F}$, there is a facility cost function $f_i$: $\{0, 1, 2, \ldots, n_c\} \to \mathfrak{R}^+$. Each facility cost function is non-negative and $f_i(0) = 0$.

In one embodiment, the method determines an assignment $\phi: C \to F$, wherein each client j is served by a facility $\phi(j)$, and $D_i(\phi) = |\{j: \phi(j) = i\}|$ is the total demand served by a facility i. If a facility serves a positive amount of demand then it is open. Otherwise, it is a closed facility. The assignment $\phi$ is determined with a goal of minimizing the total of the connection and facility costs. Specifically, one goal is to select $\phi$ to minimize $\sum_{j \in C} d_{\phi(j)j} + \sum_{i \in F} f_i(D_i(\phi))$.

In one embodiment, the method provides an algorithm for findings $\phi$. The algorithm first maintains a set of active clients A. The term "active client" refers to an as-yet unassigned client. Initially, the set of active clients is set to be the same as the entire set of clients, and the demand served by a facility i is set to zero. That is, the algorithm performs initializations as follows:

A ← C, and $D_i = 0$ for each $i \in \mathcal{F}$.

For each $i \in \mathcal{F}$ and each $k \in \{1, \ldots, |A|\}$, the method then computes the intermediate quantities:

$N_i(k)$—a subset of A, representing the k active clients that are closest to facility i $e_i(k)$—which represents the incremental facility cost incurred if k more clients were to be connected to facility i, $g_i(k)$—which represents the sum of the distances from facility i to each of the k active clients in $N_i(k)$, and $\alpha_i(k)$—which represents the cost per unit demand of connecting to facility i all of the k active clients in $N_i(k)$ and serving them.

Specifically, $N_i(k)$: List the clients j ∈ A in order of increasing value of $d_{ij}$, with ties broken arbitrarily. Let $N_i(k)$ be the first k clients in this sorted list.

$e_i(k) \leftarrow f_i(D_i+k) - f_i(D_i)$, $g_i(k) \leftarrow \Sigma_{j \in N_i(k)} d_{ij}$, and $\alpha_i(k) \leftarrow (e_i(k) + g_i(k))/k$.

In one embodiment, the method then identifies the values of i and k that minimize $\alpha_i(k)$. That is, $(\bar{i}, \bar{k}) \leftarrow \arg\min_{(i,k)} \alpha_i(k)$, wherein $(\bar{i}, \bar{k})$ minimize the incremental cost per unit demand of connecting to facility i all of the k active clients in $N_i(k)$ and serving them.

The method then connects to the facility $\bar{i}$ the $\bar{k}$ active clients that are nearest to facility $\bar{i}$. Mathematically, for each j ∈ $N_{\bar{i}}(\bar{k})$, the method connects client j to facility i. That is, the method sets $\phi(j) \leftarrow \bar{i}$.

The method then updates the amount of demand served by the facility $\bar{i}$. Mathematically, the method sets $D_{\bar{i}} \leftarrow D_{\bar{i}} + \bar{k}$. Once the amount of demand served by the facility $\bar{i}$ is updated, the method deactivates the clients that have been connected. That means, set A is updated to remove from the active set the clients that have been connected. Mathematically, the clients in $N_{\bar{i}}(\bar{k})$ are deactivated by performing $A \leftarrow A \setminus N_{\bar{i}}(\bar{k})$.

The method then determines if the set A is non-empty. If the set A is non-empty, the method then repeats the process by re-computing the intermediate quantities, identifying the most cost-effective connection of clients, and so on, until all clients are inactive.

The description now describes how one embodiment of the present invention is able to deal more efficiently with the VFL problem. For simplicity of exposition, the present description will again describe the algorithm in the case where each client represents one unit of demand. Those skilled in the art will realize that the algorithm can be modified to handle arbitrary demands from each client.

In this case, the facility cost function $f_i: \{0, 1, 2, \ldots, n_c\} \to \Re^+$. for each facility i ∈ $\mathcal{F}$ is specified by three parameters: $F_i, \Lambda_i$, and $U_i$. Specifically, $f_i(D) = F_i + \Lambda_i |D - U_i|$ for D>0, and $f_i(0) = 0$. As before, the algorithm can maintain a set A of active clients. The algorithm can also maintain a set O of open facilities.

In one embodiment, the algorithm has a notion of "time," and can maintain a priority queue of scheduled events, annotated with modifiable timestamps. This means that, in addition to inserting a new event into the queue or removing the top event from it, the algorithm can also change the timestamp of any event that is already in the queue, thereby modifying its priority. The top event in the priority queue is the one with the minimum timestamp. (If two different events have the same timestamp, the algorithm can break ties arbitrarily.)

In one embodiment, the method can maintain a graph G of "tight edges" between clients and facilities. Broadly graph G comprises a plurality of client-facility edges. A graph is simply a mathematical representation of a set of objects (denoted by "vertices" or "nodes" in the graph), where some pairs of objects are related to each other (denoted by an "edge" in the graph connecting the two related nodes). Each edge is said to be "incident" to the two nodes it connects, and vice versa. Two nodes are said to be "adjacent" to each other if they are connected by a common edge. One may visualize a graph by drawing a circle to represent each node, and a segment connecting two nodes to represent an edge between these two nodes.

The description of this algorithm will use the term "tight edge" to denote any edge in the graph G. This is to distinguish the edge from edges of another graph H, described later, that may also be used in the algorithm. At a given stage during the execution of the algorithm, there may be some facilities that are marked as "open," while the rest are so-far "unopened." Moreover, some of the clients (i.e., the inactive clients) may already be assigned to be served by open facilities, while some clients may be actively contributing towards paying the facility cost of one or more so-far unopened facilities at this stage. The graph G is simply a mathematical representation of these relationships. Each open facility has edges connecting it to each client that it is currently serving. Each unopened facility has edges connecting it to each client that is contributing towards its facility cost. Each such client is contributing at a rate equal to its demand, which is assumed to be 1 in this description. At the end of the execution of the algorithm, the graph G will encode the final solution. Specifically, in one embodiment, each client node will be incident to exactly one facility node, and this will be the open facility that is serving this client. Any facility nodes with no incident edges are facilities that are not opened by the algorithm, and hence not included in the facility plan output by it.

The events in the priority queue come in the following two varieties.

tight(i, j): The edge ij goes "tight," meaning that client j either connects to the facility i (if i is already open, i.e., i ∈ O), or begins contributing towards the facility cost of i (if i is not yet open, i.e., i ∉ O). This is represented by adding the edge ij to the graph G.

open(i): The algorithm can open facility i (i.e., add i to set O) and connect to it all of the clients that are currently contributing to it.

In one embodiment, the method can also maintain a graph H of "next" edges. Each facility i has exactly one edge in H, which joins it to the next client that is scheduled to go tight (which happens to be the closest active client). The algorithm can denote this client by next(i). This graph can be used as one of many possible convenient bookkeeping methods. The important thing is only that the algorithm be able to efficiently determine next(i) for any facility i, and for any client j, determine the set of facilities for which it is the next one scheduled to go tight, i.e., the set {i:j=next(i)}.

In one embodiment, the method can maintain variables $LTP_i$ and $t_i$ for each closed facility i (i.e., each i ∈ O). At time $t_i$, facility i had an amount $LTP_i$ left to pay before it could be opened. (LTP stands for "left to pay.") Broadly, LTP represents a residual value or threshold that must be overcome before a facility is to be opened.

In one embodiment, the method can also maintain a variable $D_i$ for each facility i, which denotes the number of tight edges incident to i in G.

In one embodiment, the algorithm starts with an initialization phase, which puts some events into the priority queue. The method then moves on to an event-processing phase, in which the method maintains a notion of the current time T. The priority queue hands the method the event with the smallest timestamp t, the method updates T to be t, and the method processes the event.

The following invariants hold immediately before the processing of each event:

The smallest timestamp t of each event in the priority queue satisfies t≥T.

For each open facility i (i.e., each i ∈ O), client j has a tight edge to i in G if and only if j is currently connected to i (i.e., currently at time T). For each closed facility i (i.e., each i ∉ O), client j has a tight edge to i if and only if j is currently contributing towards the facility cost of opening i.

$D_i = \deg_G(i)$ (the number of edges incident to node i in graph G).

The timestamp t of each event in the priority queue is the time at which the event would occur, if no other earlier events occurring between times T and t were to interfere with it.

$LTP_i$ is the amount of extra client contributions that were necessary, as of time $t_i$, to open facility i.

For each facility i, there is exactly one tight(i, j) event in the priority queue, and it is for j=next(i). Thus, when event tight(i, j) begins to be processed, it is the case that j=next(i).

In one embodiment, the method can continue processing events until there are no more active clients, i.e., A=∅ (the empty set).

The following describes the initialization phase:

A←C (i.e., initialize all clients to be active)

O←∅ (i.e., initialize the set of open facilities to be empty)

Graphs G and H each get one vertex for each client j ∈ C and facility i ∈ F but start with no edges.

For each facility i, identify the client j that is closest to i (i.e., for which $d_{ij}$ is minimum). Insert edge ij into graph H, and push event tight(i, j) onto the priority queue with timestamp $d_{ij}-\Lambda_i$.

For each facility i, $LTP_i \leftarrow F_i + \Lambda_i U_i$ and $t_i \leftarrow -\Lambda_i$. (Note: this initial value for $t_i$ is immaterial, because the only time it gets used is in the first call to update_LTP(i), where it will be multiplied by zero.)

For each facility i, push event open(i) onto the priority queue with timestamp ∞.

The processing of each event and the various subroutines used therein are now described. To improve the exposition, each subroutine is described only after the point where it is first called.

process event tight(i, j) at time t (for facility i, client j):
1. T←t
2. update_LTP(i)
3. add edge ij to G
4. $D_i \leftarrow D_i + 1$
5. update_next(i)
6. if facility i is open (i.e., i ∈ O), then connect(i, j)
7. else update_open_stamp(i)

process event open(i) at time t (for facility i):
1. T←t
2. optionally, update_LTP(i) (assertion: $LTP_i$ is now zero)
3. open facility i by adding it to the set O of open facilities, i.e., O←O∪{i}
4. for each client j adjacent to facility i in the graph G, connect(i, j)

update_LTP(i) (for facility i, update $LTP_i$ to be accurate as of time T):
1. if facility i is already open (i.e., i ∈ O), do nothing
2. otherwise: $LTP_i \leftarrow LTP_i - D_i(T-t_i)$, and $t_i \leftarrow T$, i.e., update $LTP_i$ to reflect the fact that $D_i$ clients have been paying off the facility cost at rate 1 since time $t_i$, and update $t_i$ to the current time T.

update_open_stamp(i) (for facility i): update the timestamp of the open(i) event in the priority queue to be $$T + \frac{LTP_i}{D_i}$$

(taking this to be ∞ if $D_i$ is zero)

update_next(i) (update the edge incident to facility i in graph H):
1. delete the edge incident to i in H, and replace it with an edge from i to the closest client j ∈ A that is not already adjacent to i in G
2. push the event tight(i, j) onto the priority queue with timestamp $d_{ij}-\Lambda_i$ (if $D_i<U_i$) or timestamp $d_{ij}+\Lambda_i$ (if $D_i \geq U_i$)

connect(i, j) (for facility i, client j):
1. deactivate client j by removing it from the active set A, i.e., A←A\{j}
2. for each facility i' adjacent to client j in the graph H, update_next(i')
3. for each facility i'≠i adjacent to j in the graph G, withdraw(i', j)

withdraw(i, j) (withdraw contribution of client j to facility i; this will be called only for so-far unopen facilities, i.e., i ∉ O):
1. update_LTP(i)
2. if $D_i \leq U_i$, then let $LTP_i \leftarrow LTP_i + (T-d_{ij}+\Lambda_i)$ (i.e., retract the contribution from client j, accounting for the fact that this contribution is decreased by $\Lambda_i$ since facility i is currently overfull)
3. else let $LTP_i \leftarrow LTP_i + (T-d_{ij}-\Lambda_i)$ (i.e., retract the contribution from client j, accounting for the fact that this contribution is increased by $\Lambda_i$ since facility i is currently underfull)
4. delete ij from G (because client j is no longer contributing to facility i)
5. dec_demand(i) (because facility i has one fewer clients contributing)
6. update_open_stamp(i) (because the rate at which facility i's cost is being paid off just decreased, and the amount left to pay $LTP_i$ increased, so its projected opening time is later)

dec_demand(i) (decrement the demand attached to an unopen facility i, i.e., an i ∈ O):
1. $D_i \leftarrow D_i - 1$
2. if $D_i = U_i - 1$, then (the facility just went from being overfull to underfull, so the next tight event must be scheduled earlier)
   a. let j←next(i), newtime←$d_{ij}-\Lambda_i$
   b. if newtime≥T, then update timestamp of event tight(i, j) to be newtime
   c. if newtime<T, then (if moving the next tight event forward in time caused it to happen in the past, we must, in effect, process it immediately)
      i. delete event tight(i, j) from queue
      ii. add edge ij to G
      iii. $D_i \leftarrow D_i + 1$
      iv. $LTP_i \leftarrow LTP_i - (T-\text{newtime})$
      v. $t_i \leftarrow T$
      vi. update_next(i)

This completes the description of the present algorithm for the VFL problem. This algorithm can be applied to the UVFL problem without modification. The only difference is that the triple of input parameters $(F_i, \Lambda_i, U_i)$ happens to be the same for each facility i ∈ F.

One application for the UVFL problem is where one may want to open some number B of facilities in such a way that the facilities each serve a roughly equal amount of demand (i.e., in the unit demand case, this would equal the number of clients), and each client is served either by its nearest open facility, or one that is almost as close. Let $F_0, \Lambda$, and U denote the common values of $F_i, \Lambda_i$, and $U_i$ (for all $i \in F$). One strategy is to run the algorithm of the present invention with different values of $F_0, \Lambda$, and U until such a solution is generated.

In any optimal solution, the only reason that a client j would be assigned to a facility i' other than the closest open facility i, is if i is overfull while i' is underfull and, moreover, $d_{i'j} < d_{ij} + 2\Lambda$, because then the combined savings in under- and overfullness penalties is enough to overwhelm the extra connection cost. Thus, choosing a fairly small value of $\Lambda$ ensures that each client is assigned to a facility that is at least almost as close as its nearest one. On the other hand, choosing a large value of $\Lambda$ (the penalty rate for under- and overfullness) forces each facility to serve roughly U clients.

Choosing a large value of $F_0$ will force the algorithm to choose fewer facilities at the expense of a higher overall connection cost. Choosing a lower value of $F_0$ will allow for a larger number of facilities, which allows for a lower overall connection cost.

Since one aim is to open B facilities, each serving U clients, one can set $$U = \frac{|C|}{B}.$$

In the limit where $F_0$ approaches $\infty$, only one facility will be opened. In the limit where $\Lambda$ approaches $\infty$, exactly B facilities will be opened, and they will be perfectly load-balanced. In one embodiment, the present method uses the following strategy to set $F_0$ and $\Lambda$ so that it opens roughly B approximately load-balanced facilities. The method starts with $F_0=0$ and $\Lambda=0$. This setting opens all facilities. The method then increases $\Lambda$ until it opens about 2B facilities. It then increases $F_0$ until the number of open facilities is close to B. In another embodiment, the method first increases $F_0$ until the number of open facilities is close to B, then increases $\Lambda$ until the desired level of load balance is achieved.

Figure 3:
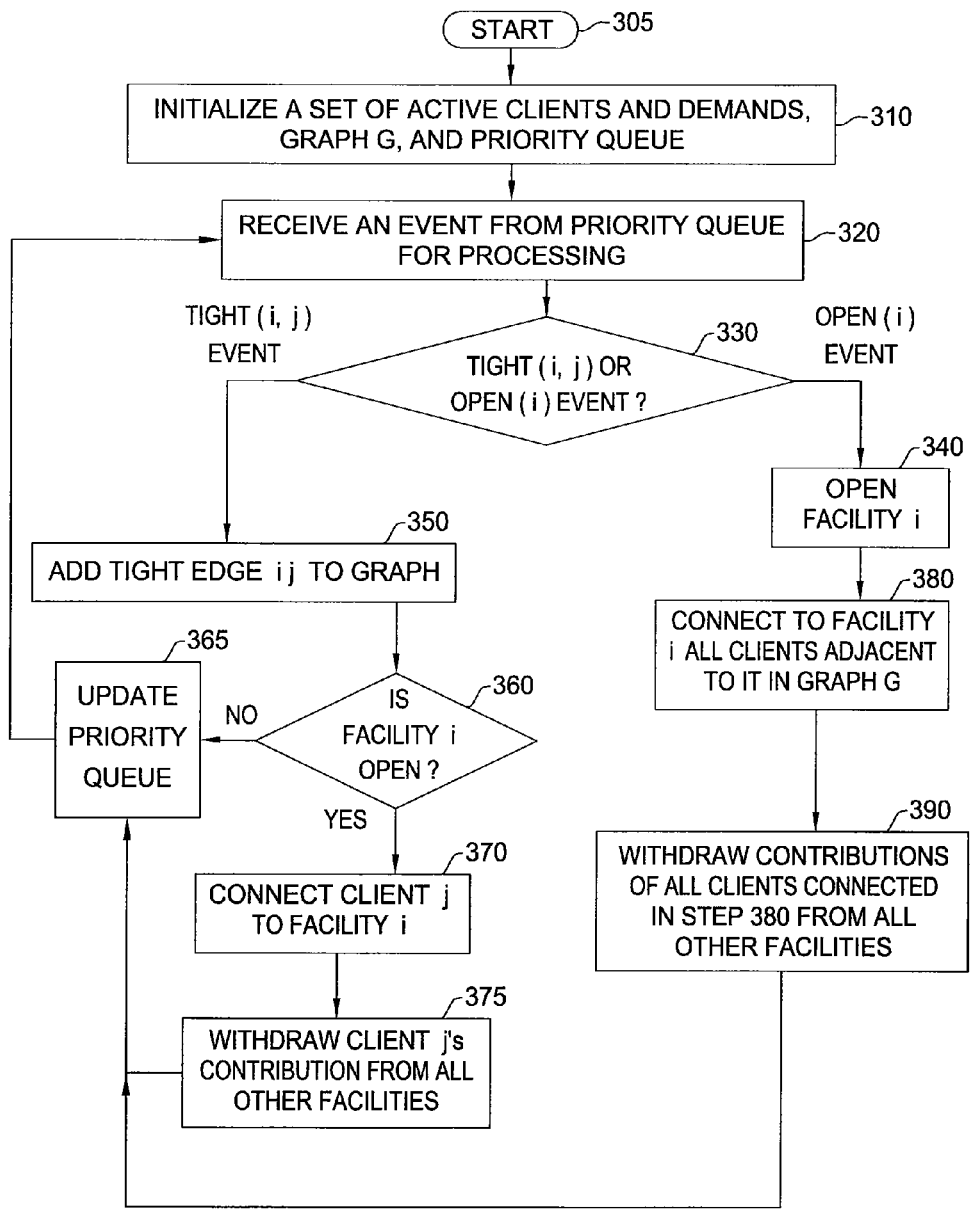
FIG. 3 illustrates a flowchart of a method for planning facility locations for a network with a V-shaped facility cost.

FIG. 3 illustrates an exemplary flowchart of a method 300 for locating facilities with V-shaped facility costs. For example, one or more steps of method 300 can be implemented by the application server 212. Method 300 starts in step 305 and proceeds to step 310.

In step 310, method 300 initializes a set of active clients and demand served by each facility, a graph G, and a priority queue of events. For example, the set of active clients may be set to be the same as the set of clients, and the demand served by a facility i may be set to zero. The graph G may be set to have one node for each facility, one node for each client and no edges. The method may insert one open(i) event into the queue for each facility i, with timestamp $\infty$. The method may also insert one tight(i, j) event into the queue for each facility i, where j=next(i).

In step 320, the method receives an event, e.g., an event can be obtained from a priority queue of scheduled events as discussed above. In one embodiment, the event may comprise a "tight" event (e.g., an edge going tight, and thus being added to the graph G of tight edges) or an "open" event (e.g., opening a facility i and connecting all clients j that are currently contributing to it) as discussed above. It should be noted that an "edge" is broadly referred to as a client-facility pair; mathematically, this is an edge in the graph G.

In step 330, the method determines the type of event. If the event is a tight event, the method proceeds to step 350. If the event is an open event, the method proceeds to step 340.

In step 350, the method adds the edge ij to the graph G. In other words, the newly determined client-facility pair or edge (i, j) is added to the graph G for a facility i and client j.

In step 360, the method determines whether a facility i has already been opened. For example, it can check whether i is a member of the set O defined above. This set O could be represented by a collection of "flag" variables, one for each facility, that tells whether the facility has been opened. If the query is positively answered, then method 300 proceeds to step 370. Otherwise, the method proceeds to step 365.

In step 370, the method connects the single new client j to the opened facility i. The method then proceeds to step 375.

In step 375, the method withdraws client j's contribution to all other facilities. In other words, if the new client j is currently contributing to more than one facility, and if new client j is subsequently connected to one of the facilities, then j's contribution to the other facilities will be withdrawn. The method then proceeds to step 365.

In step 340, the method adds a facility i to the set O of open facilities. The method then proceeds to step 380.

In step 380, the method connects all clients j that are adjacent to the facility i in the graph G ("adjacent" broadly refers to all clients j that are connected to the facility i by edges in G). These are exactly the clients that are currently contributing toward paying the facility cost of facility i. The method then proceeds to step 390.

In step 390, the method considers each client that was connected to facility i in step 380, and withdraws these clients' contributions to all other facilities. In other words, if any client is contributing to more than one facility, and the client is subsequently connected to one of the facilities, then the client's contribution to the other facilities will be withdrawn. The method then proceeds to step 365.

In step 365, the method updates the timestamps of various events in the priority queue, depending on whether the step was entered from step 360, 375, or 390. If it was entered from step 360, then there is an update to the timestamp of the open(i) event, to reflect the fact that facility i's cost is now being paid off at a higher rate, since one extra client (specifically, client j) is now contributing. A new tight event is also pushed onto the queue to replace the one that was just processed. If step 365 was entered from step 375, then the timestamp of the open(i') event is modified for each facility i' from which client j withdrew its contribution in step 375. This to account for the withdrawal of j's contribution, and the fact that it will no longer contribute to facility i' going forward. If step 365 is entered from step 390, it is handled exactly the same way as if it were entered from step 375, except that in step 390 there may have been multiple clients who withdrew their contributions, rather than just the single client in step 375, and so the timestamp updates on the open events must handle these contribution withdrawals from multiple clients. The method then returns to step 320 to process the next event.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
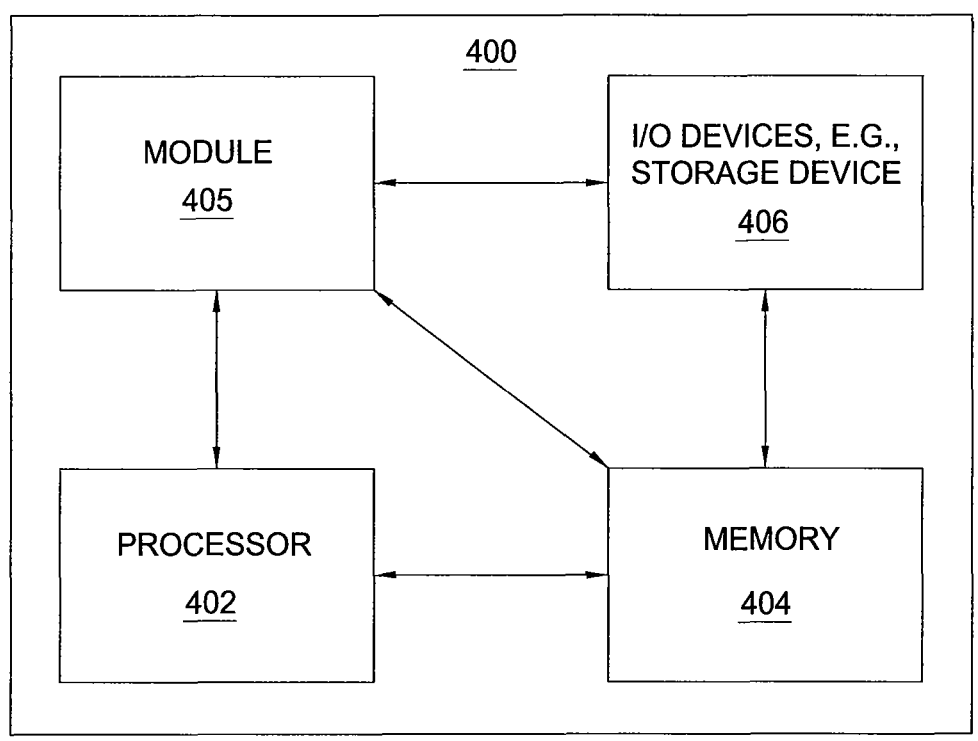
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a facility location plan for a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a facility location plan for a network can be loaded into memory 404 and executed by processor 402 to implement the functions as discussed above. As such, the present method 405 for providing a facility location plan for a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a facility location plan for a network with a V-shaped facility cost, comprising:
   receiving, via a processor, an open event and a tight event from a queue;
   connecting, via the processor, a plurality of adjacent clients to a facility for the open event; and
   adding, via the processor, a new client-facility edge to a graph comprising a plurality of client-facility edges for the tight event.

2. The method of claim 1, further comprising:
   updating the queue for the tight event, and if it is determined that the facility is not to be opened.

3. The method of claim 1, further comprising:
   connecting a new client to the facility for the tight event, and if it is determined that the facility is opened.

4. The method of claim 3, further comprising:
   withdrawing a contribution of the new client from other facilities.

5. The method of claim 4, further comprising:
   updating the queue.

6. The method of claim 1, wherein the connecting the plurality of adjacent clients to the facility comprises opening the facility prior to connecting the plurality of adjacent clients to the facility.

7. The method of claim 6, further comprising:
   withdrawing contributions of the plurality of adjacent clients from other facilities.

8. The method of claim 7, further comprising:
   updating the queue.

9. A non-transitory computer-readable medium to store a plurality of instructions which, when executed by a processor, cause the processor to perform operations for providing a facility location plan for a network with a V-shaped facility cost, the operations comprising:
   receiving an open event and a tight event from a queue;
   connecting a plurality of adjacent clients to a facility for the open event; and
   adding a new client-facility edge to a graph comprising a plurality of client-facility edges for the tight event.

10. The non-transitory computer-readable medium of claim 9, further comprising:
    updating the queue for the tight event, and if it is determined that the facility is not to be opened.

11. The non-transitory computer-readable medium of claim 9, further comprising:
    connecting a new client to the facility for the tight event, and if it is determined that the facility is opened.

12. The non-transitory computer-readable medium of claim 11, further comprising:
    withdrawing a contribution of the new client from other facilities.

13. The non-transitory computer-readable medium of claim 12, further comprising:
    updating the queue.

14. The non-transitory computer-readable medium of claim 9, wherein the connecting the plurality of adjacent clients to the facility comprises opening the facility prior to connecting the plurality of adjacent clients to the facility.

15. The non-transitory computer-readable medium of claim 14, further comprising:
    withdrawing contributions of the plurality of adjacent clients from other facilities.

16. The non-transitory computer-readable medium of claim 15, further comprising:
    updating the queue.

17. An apparatus for providing a facility location plan for a network with a V-shaped facility cost, comprising:
    a processor; and
    a computer-readable medium in communication with the processor, to store a plurality of instructions which, when executed by the processor, cause the processor to perform operations, the operations comprising:
      receiving an open event and a tight event from a queue;
      connecting a plurality of adjacent clients to a facility for the open event; and
      adding a new client-facility edge to a graph comprising a plurality of client-facility edges for the tight event.

18. The apparatus of claim 17, further comprising:
    updating the queue for the tight event, and if it is determined that the facility is not to be opened.

19. The apparatus of claim 17, further comprising:
    connecting a new client to the facility for the tight event, and if it is determined that the facility is opened.

20. The apparatus of claim 19, further comprising:
    withdrawing a contribution of the new client from other facilities.

* * * * *